United States Patent
Burton et al.

(10) Patent No.: US 6,597,136 B2
(45) Date of Patent: Jul. 22, 2003

(54) COMPENSATION FOR MOTOR INERTIA IN ELECTRIC POWER ASSISTED STEERING SYSTEMS

(75) Inventors: Anthony Walter Burton, Birmingham (GB); Simon David Stevens, Birmingham (GB); Russell Wilson Jones, Warwickshire (GB); Marie Saunier, Sutton Coldfield (GB); Tom Michael Richard Ernest Roberts, Lancashire (GB)

(73) Assignee: TRW LucasVarity Electric Steering Ltd., West Midlands (GB)

( * ) Notice: Subject to any disclaimer, the term of this patent is extended or adjusted under 35 U.S.C. 154(b) by 0 days.

(21) Appl. No.: 10/002,946

(22) Filed: Nov. 15, 2001

(65) Prior Publication Data

US 2002/0125845 A1 Sep. 12, 2002

(30) Foreign Application Priority Data

Nov. 22, 2000 (GB) ................................................ 0028416

(51) Int. Cl.⁷ .................................................. H02P 7/00
(52) U.S. Cl. .......................... 318/432; 318/9; 318/433; 318/434
(58) Field of Search ................................. 318/432–434, 318/474, 9, 11; 701/41, 42; 180/443–446, 421, 422

(56) References Cited

U.S. PATENT DOCUMENTS

| 4,972,320 | A | | 11/1990 | Sugiura et al. ......... 364/424.05 |
|---|---|---|---|---|
| 5,072,804 | A | * | 12/1991 | Bischof et al. ............. 180/142 |
| 5,719,766 | A | * | 2/1998 | Bolourchi et al. .... 364/424.052 |
| 5,740,040 | A | * | 4/1998 | Kifuku et al. ......... 364/424.051 |
| 5,740,880 | A | * | 4/1998 | Miller ........................ 180/446 |
| 6,154,696 | A | * | 11/2000 | Nishi et al. .................... 701/41 |
| 6,360,151 | B1 | * | 3/2002 | Suzuki et al. ................. 701/41 |
| 6,402,335 | B1 | * | 6/2002 | Kalantar et al. .............. 362/31 |

FOREIGN PATENT DOCUMENTS

| EP | 0718142 A2 | 6/1996 |
|---|---|---|
| GB | 2175551 A | 12/1986 |

* cited by examiner

Primary Examiner—Bentsu Ro
Assistant Examiner—Rina I. Duda
(74) Attorney, Agent, or Firm—Tarolli, Sundheim, Covell & Tummino L.L.P.

(57) ABSTRACT

An electric power assisted steering system of the kind in which an electric motor is operatively connected to a steering assembly through a gearbox to apply an assistance torque to the steering assembly and in which the steering assembly includes a steering column coupled at one end to a driver's handwheel and at the other end to steerable wheels, a means being provided for generating a signal representative of the velocity of rotation of the steering column. The system includes a high pass filter which is adapted to generate, for frequencies below a prescribed threshold, a signal at least approximately proportional to steering column acceleration and representative of the inertia of the rotor of the electric motor, the latter signal being arranged to be used to compensate for the motor rotor inertia in an overall assistance torque demand as developed by the system.

4 Claims, 1 Drawing Sheet

COMPENSATION FOR MOTOR INERTIA IN ELECTRIC POWER ASSISTED STEERING SYSTEMS

BACKGROUND OF THE INVENTION

The present invention relates to electric power assisted steering systems (EAS) and is concerned in particular with a method and apparatus to be incorporated in a control system for an electrically powered steering system for compensating for inertia within the system generated by the electric assist motor.

Typically, an EAS system comprises a driver's steering wheel or handle through which the driver inputs a steering demand. The steering demand produces a torque input which has both magnitude and directional sense. The steering wheel is connected to a steering column/shaft which carries within a portion of the shaft a torque sensor for measuring the driver's steering demand. Preferably the sensor, either alone or in combination with additional sensors, provides signals corresponding to the steering wheel position, which can be further used to determine steering speed and thus steering acceleration. All of these signals are measurements corresponding to the driver's steering input or steering demand.

The driver's steering demand is processed in accordance with a basic steering torque servo control which provides an output signal, dependent upon the driver's demand, to an electric assist motor, which adds in steering assist torque into the steering shaft, downstream of the torque sensor. The electric assist motor is typically connected to the steering shaft by some form of gearbox, the ratio of which is set by determining the range of assistance torque and system response required for a particular system installation. Finally, the steering shaft is operatively connected to the steerable road wheels by a rack and pinion steering assembly, which could optionally carry the electric assist motor instead of the steering shaft depending upon the particular installation constraints.

In operation, the system has to cope with a wide variety of driver's steering inputs and other external demands as imposed on the system during normal running, such as speed dependent self centring torques developed at the road wheels, or torsional fluctuations developed as the road wheels pass over a changing road surface. There is a need to compensate for each of these additional external system inputs if the whole steering system is to remain stable under all operating conditions.

One particular disturbance, developed within the electro-mechanical steering system itself, for which compensation needs to be provided, is the torsional drag induced within the steering system as a result of inertia predominantly within the electric assist motor.

It is one object of the present invention to provide a method and apparatus to compensate for torsional drag induced within the steering system as a result of reflected system inertia.

It is known within EAS systems of the present kind to add in a term to the assistance torque calculation that compensates for the above described reflected system inertia. As described for example in GB 2175551 and U.S. Pat. No. 5,740,040, this is usually done by providing a value which is proportional to the steering acceleration as derived by differentiating the steering column velocity. It has been found however that the base steering column velocity signal as measured at the steering column carries not only the driver's steering demand velocity but also other shifting disturbances as described above which, when differentiated, induce acceleration terms into the inertia compensating calculation which has the potential to make the system unstable. Typically, the driver would be able to input a steering demand which could develop a measurable change within the system at a rate of up to 5 Hz, as could be demanded during a 'panic steering manoeuvre' to avoid an obstacle. Noise, developed from external background sources, such as running over a rough road, would typically be at higher frequencies such as in the region of 10 to 20 Hz or higher. Another object of the present invention is to compensate only for those changes within the system that can be directly attributed to the driver's steering demand, i.e. below a frequency response which could be reasonably achieved by the driver.

BRIEF SUMMARY OF THE INVENTION

In accordance with the present invention there is provided an electric power assisted steering system of the kind in which an electric motor is operatively connected to a steering assembly through a gearbox to apply an assistance torque to the steering assembly and in which the steering assembly includes a steering column coupled at one end to a driver's handwheel and at the other end to steerable wheels, a means being provided for generating a signal representative of the velocity of rotation of the steering column, wherein the system includes a high pass filter means which is adapted to generate, for frequencies below a prescribed threshold, a signal at least approximately proportional to steering column acceleration and representative of the inertia of the rotor of said electric motor, the latter signal being arranged to be used to compensate for said motor rotor inertia in an overall assistance torque demand as developed by the system.

In one preferred embodiment, the steering column acceleration signal is applied to a gain control means to provide a torque output signal which is factored to take account of the ratio of the gear box employed in the system between the motor and the steering column or steering linkage.

Preferably, the factored torque signal is passed through a limit means which imposes a limit on the magnitude of the developed torque signal to produce a capped assistance torque demand signal. The capped assistance torque demand signal can then be added to a basic servo assistance torque demand provided by the system whereby to provide a compensated overall assistance torque demand for the system.

BRIEF DESCRIPTION OF THE DRAWINGS

The invention is described further hereinafter, by way of example only, with reference to the accompanying drawings, in which.

DETAILED DESCRIPTION OF THE INVENTION

Figure 1:
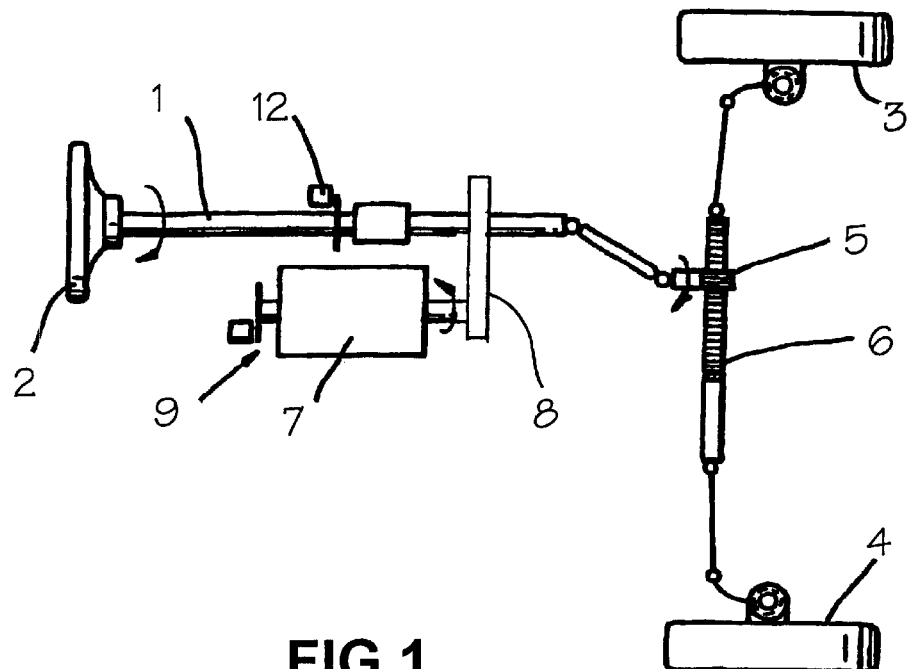
FIG. 1 is a simplified schematic illustration of an electrical power assisted steering system to which the present invention is applicable.

Referring first to FIG. 1, the illustrated system comprises a steering column/shaft 1 operatively connected at one end to a steering wheel 2 and at its opposite end to a pair of road wheels 3, 4 through a rack and pinion gearbox 5, 6. To provide torque assistance to the driver, the system further comprises an electric motor 7 connected to the steering shaft 1 through a reduction gearbox 8 which comprises, in this embodiment, a worm and wheel combination with a reversible tooth form. The motor 7 typically comprises a 3-phase permanent magnet brushless motor and has an associated sensing means 9 for detecting the electrical angle of the motor rotor. This can be achieved, for example, by measuring the position of the rotor magnets using an array of Hall effect sensors arranged around the motor.

For providing accurate control of the motor 7, a combined torque/position sensor 12 is provided which measures the torque applied to the steering shaft 1 by the driver acting on the steering wheel 2. The output from the torque sensor, which is indicative of torque, is used to produce a motor current demand value. This in turn is used to produce a motor current signal which controls the currents applied to the motor. In addition to producing an output indicative of torque, the torque sensor produces an output signal indicative of the angle of the steering shaft.

When the motor 7 is a high output motor, the rotational inertia of the motor rotor becomes significant and can affect steering performance and driver "feel". Steering performance is affected because, under certain driving conditions, the motor inertia acts in opposition to the self-aligning moment generated by the tires through the vehicle suspension geometry.

This means in practice that the rate of return of the steering wheel to the centre on entering a corner/turn is slowed down, adversely affecting both the self-centering action and the dynamic yaw response of the vehicle. The driver feel is affected by the fact that the motor inertia force acts in opposition to the driver input. If the rate of change of driver-induced handwheel velocity is high enough, then the opposing inertial force will be felt by the driver. The higher the motor inertia is, the slower the rate of change of driver input torque needs to be before the inertial effect becomes apparent to the driver. Both of these effects are amplified in the reduction gearbox 8 employed between the motor 7 and the steering shaft 1 because the gearbox has the effect of amplifying the inertia reflected onto the steering shaft 1 by the square of the gearbox ratio.

It can be demonstrated mathematically, as set out below, that the motor rotor inertia is proportional to steering column/shaft acceleration, including the gearbox scaling.

Thus, if Ncol is the angular velocity of the steering column, Nmot, is the angular velocity of the EPS motor, and ngb is the EPS gearbox ratio, then the gearing is such that:

$$Ncol = \frac{Nmot}{ngb} \quad [1]$$

In other words, the column angular is ngb times smaller than the motor angular velocity. Conversely, the action of the gearbox is to amplify the torque produced by the motor Tmot so that the column torque Tcol is given by:

$$Tcol = Tmot.ngb \quad [2]$$

Now, the inertial torque of the motor (by Newton's second law) is given by the product of the motor rotor inertia Jmot and the rotor angular acceleration ωmot, ie:

$$Tmot = Jmot.\omega mot \quad [3]$$

Substituting this equation [3] into the one above [2] gives:

$$Tcol = Jmot.\omega mot.ngb \quad [4]$$

Using [1] this can be re-written as:

$$Tcol = Jmot.\omega col.ngb^2 \quad [5]$$

In other words, the torque applied to the steering column due to the motor inertia is the product of the motor inertia itself, the square of the gearbox ratio and the angular acceleration of the driver's handwheel.

Figure 2:
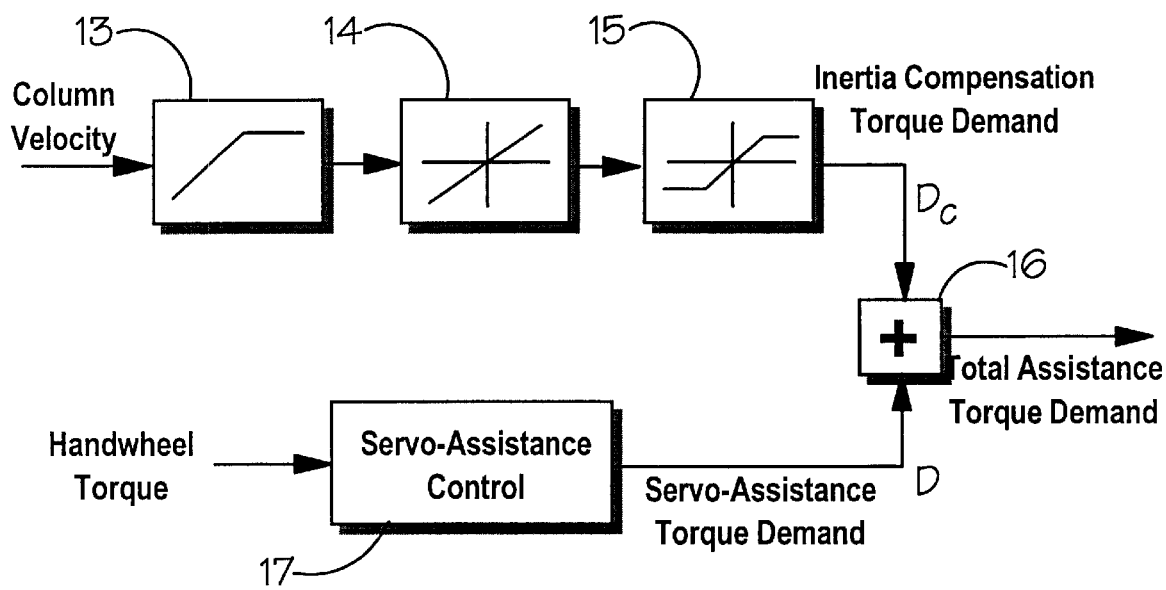
FIG. 2 is a simplified block diagram illustrating one embodiment in accordance with the present invention for deriving compensation for inertia within the system generated by the electric assist motor.

FIG. 2 shows how an inertia compensation function based on the angular acceleration of the driver's handwheel can be generated to compensate for the motor rotor inertia which is reflected through the gearbox 8 to the steering wheel 2.

A steering shaft velocity signal is provided by the EAS control system (not illustrated) in response to signals generated by the sensor 12, as the input to the inertia compensating function. This column velocity could be a simple velocity signal or may also incorporate the sign of the velocity as well, i.e. the direction of the velocity-clockwise or anticlockwise.

The column velocity signal is applied to a filter 13 where, for frequencies below a prescribed threshold, typically 5 Hz, a torque output signal is developed which is substantially proportional to a steering column acceleration which is produced within the filter 13 as being proportional to the column velocity input.

The steering column acceleration related torque signal from the filter 13 is fed to the input of a gain control means 14 which provides a torque output signal which is factored up to take account of the gearbox ratio employed within the EAS system to develop a compensating torque signal which is proportional to the motor rotor acceleration.

The factored torque signal from the gain control means 14 is passed to a limit control stage 15 which imposes a limit on the magnitude of the developed torque signal to produce a capped assistance torque demand signal Dc which varies as a prescribed function of column velocity, which is added to the overall assistance torque demand as developed by the EAS.

The capped assistance torque demand signal Dc is passed to an adder 16 which adds this signal Dc to the basic servo-assistance torque demand D provided by the servo-assistance control 17 in response to the measured handwheel torque applied to it.

By this arrangement, the inertia compensation function compensates for the motor rotor inertia which is reflected through the EPS gearbox to the hand wheel, the inertia torque demand signal being derived in such a way that it is (approximately) equal in magnitude but opposite in sign to the actual inertial force associated with the motor rotor. In this way, a significant proportion of the inertial force can be cancelled.

The use of the high pass filter 13 to generate an approximate motor acceleration signal from the column velocity signal has the advantage that this offers a reduction in signal noise above the breakpoint frequency compared to a pure differential operation as used in the prior art.

The function of the filter is to essentially provide a component of assistance torque proportional to the motor rotor acceleration which is used to cancel its resulting inertial force over a limited band of amplitude and frequency.

In practice, the elements 13, 14, 15 would normally be achieved by way of a software algorithm rather than discrete components, although of course discrete components could be used if desired.

What is claimed is:

1. An electric power assisted steering system of the kind in which an electric motor is operatively connected to a steering assembly through a gearbox to apply an assistance torque to the steering assembly and in which the steering assembly includes a steering column coupled at one end to a driver's handwheel and at the other end to steerable wheels, a means being provided for generating a signal representative of the velocity of rotation of the steering column, wherein the system includes a high pass filter means which is adapted to generate, for frequencies below a prescribed threshold, a signal at least approximately proportional to steering column acceleration and representative of the inertia of the rotor of said electric motor, the latter signal being arranged to be used to compensate for said motor rotor inertia in an overall assistance torque demand as developed by the system.

2. A steering system according to claim 1, wherein the steering column acceleration signal is applied to a gain control means to provide a torque output signal which is factored to take account of the ratio of a gearbox employed in the system between the motor and the steering column or steering linkage.

3. A steering system according to claim 2, wherein the factored torque signal is passed through a limit means which imposes a limit on the magnitude of the developed torque signal to produce a capped assistance torque demand signal.

4. A steering system according to claim 3, wherein the capped assistance torque demand signal is added to a basic servo assistance torque demand provided by the system whereby to provide a compensated overall assistance torque demand for the system.

* * * * *